(12) United States Patent
Desberg

(10) Patent No.: US 10,569,797 B2
(45) Date of Patent: Feb. 25, 2020

(54) RIDABLE KART

(71) Applicant: RAZOR USA LLC, Cerritos, CA (US)

(72) Inventor: Ian Desberg, Cerritos, CA (US)

(73) Assignee: RAZOR USA LLC, Cerritos, CA (US)

( * ) Notice: Subject to any disclaimer, the term of this patent is extended or adjusted under 35 U.S.C. 154(b) by 0 days.

(21) Appl. No.: 16/386,539

(22) Filed: Apr. 17, 2019

(65) Prior Publication Data

US 2020/0010104 A1  Jan. 9, 2020

Related U.S. Application Data

(63) Continuation of application No. 15/839,409, filed on Dec. 12, 2017, now Pat. No. 10,266,197.

(60) Provisional application No. 62/434,236, filed on Dec. 14, 2016.

(51) Int. Cl.
| | |
|---|---|
| *B62B 7/00* | (2006.01) |
| *B62B 7/04* | (2006.01) |
| *B62B 9/20* | (2006.01) |
| *B62B 9/12* | (2006.01) |
| *B62K 9/02* | (2006.01) |
| *B62B 9/10* | (2006.01) |
| *B62D 21/18* | (2006.01) |

(52) U.S. Cl.
CPC ............... *B62B 7/044* (2013.01); *B62B 7/00* (2013.01); *B62B 7/006* (2013.01); *B62B 7/04* (2013.01); *B62B 7/042* (2013.01); *B62B 9/10* (2013.01); *B62B 9/102* (2013.01); *B62B 9/12* (2013.01); *B62B 9/20* (2013.01); *B62B 9/206* (2013.01); *B62K 9/02* (2013.01); *B60G 2200/14* (2013.01); *B62D 21/183* (2013.01)

(58) Field of Classification Search
CPC .......... A63B 2055/601; A63B 2210/50; A63B 55/57; A63B 55/61; B60K 1/04; B62M 6/60; B62M 6/90
See application file for complete search history.

(56) References Cited

U.S. PATENT DOCUMENTS

| | | |
|---|---|---|
| 2,219,905 A | 10/1940 | Prickman |
| D213,370 S | 2/1969 | Cherry |
| 3,437,161 A | 4/1969 | Ufford |
| D214,576 S | 7/1969 | King |
| D215,861 S | 11/1969 | Cook |
| D220,509 S | 4/1971 | Schreckengost |
| 3,604,722 A | 9/1971 | Boley |
| 3,870,334 A | 3/1975 | Cole |
| D251,324 S | 3/1979 | Vaughn |
| D252,651 S | 8/1979 | Tepper |
| D254,380 S | 3/1980 | Thomas |
| D258,368 S | 2/1981 | Cornish |
| D266,100 S | 9/1982 | Miller |
| 4,359,231 A | 11/1982 | Mulcahy |

(Continued)

*Primary Examiner* — John D Walters
*Assistant Examiner* — James J Triggs
(74) *Attorney, Agent, or Firm* — Knobbe Martens Olson & Bear, LLP

(57) ABSTRACT

A ridable kart can have a body that supports a front wheel and movable rear wheels. The kart can include a motor that supports and drives the rear wheels. The motor and rear wheels are configured to tilt and rotate relative to the body of the kart. The body of the kart includes a concave space in which the front and rear wheels are positioned so that they are at least partially concealed by the body when viewed from the side of the kart.

20 Claims, 12 Drawing Sheets

(56) References Cited

U.S. PATENT DOCUMENTS

| | | | |
|---|---|---|---|
| D276,058 S | 10/1984 | Rogers | |
| 4,484,646 A | 11/1984 | Smith | |
| 4,516,648 A | 5/1985 | Berger | |
| 4,562,893 A | 1/1986 | Cunard | |
| 4,573,696 A | 3/1986 | Buroff | |
| 4,645,257 A | 2/1987 | Salmon | |
| D292,301 S | 10/1987 | Lohmann | |
| D300,127 S | 3/1989 | Poss | |
| D301,497 S | 6/1989 | Gassaway | |
| 4,875,694 A * | 10/1989 | Hamrick | B25H 5/00 280/32.6 |
| 4,896,899 A | 1/1990 | Lawrence | |
| D316,281 S | 4/1991 | Mirisch, Sr. | |
| 5,046,750 A * | 9/1991 | Heubl | B62K 9/00 280/47.34 |
| 5,069,469 A * | 12/1991 | Rosengrant | B62K 3/005 280/259 |
| 5,265,690 A * | 11/1993 | Amundsen | B62D 21/183 180/311 |
| D343,424 S | 1/1994 | Lamb | |
| D354,599 S | 1/1995 | Young | |
| D368,743 S | 4/1996 | Amburgey | |
| D382,917 S | 8/1997 | Brodoski | |
| D384,706 S | 10/1997 | Temple | |
| D406,684 S | 3/1999 | Pool | |
| D412,138 S | 7/1999 | Triarsi et al. | |
| 6,026,923 A | 2/2000 | Uphaus | |
| D437,364 S | 2/2001 | Jang | |
| D440,607 S | 4/2001 | Mahlow | |
| D446,827 S | 8/2001 | You et al. | |
| 6,276,700 B1 | 8/2001 | Way et al. | |
| D464,999 S | 10/2002 | Gu | |
| D465,814 S | 11/2002 | Koveleski | |
| D466,560 S | 12/2002 | Stolpmann | |
| D469,819 S | 2/2003 | Nicolle et al. | |
| D471,936 S | 3/2003 | Tilbor | |
| D512,467 S | 12/2005 | Hadley | |
| 7,114,742 B1 | 10/2006 | Sterns | |
| 7,198,322 B2 | 4/2007 | Savo | |
| D562,914 S | 2/2008 | Oveson et al. | |
| 7,328,764 B2 | 2/2008 | Penz | |
| D570,572 S | 6/2008 | Whiteside et al. | |
| 7,392,877 B2 | 7/2008 | Woods | |
| D576,373 S | 9/2008 | Whiteside et al. | |
| D582,992 S | 12/2008 | Alais | |
| D601,640 S | 10/2009 | McIlvain | |
| 7,726,668 B2 * | 6/2010 | Sieb | B25H 5/00 280/32.6 |
| 7,823,675 B2 | 11/2010 | Kermani | |
| D637,660 S | 5/2011 | Markowitz | |
| 7,988,402 B2 | 8/2011 | Adams | |
| 8,210,555 B2 | 7/2012 | Belenkov et al. | |
| D705,128 S | 5/2014 | Patterson et al. | |
| 8,801,005 B1 | 8/2014 | Flickner | |
| D761,700 S | 7/2016 | Kermani | |
| D764,600 S | 8/2016 | Desberg | |
| D764,601 S | 8/2016 | Desberg | |
| D766,780 S | 9/2016 | Fusco | |
| D768,788 S | 10/2016 | Orenstein et al. | |
| D771,196 S | 11/2016 | Chen | |
| 9,494,438 B1 * | 11/2016 | Ichinokawa | G01C 21/30 |
| D764,602 S | 12/2016 | Desberg | |
| D774,602 S | 12/2016 | Desberg | |
| D774,981 S | 12/2016 | Chen | |
| D775,282 S | 12/2016 | Williams et al. | |
| D787,609 S | 5/2017 | Desberg | |
| D787,610 S | 5/2017 | Desberg | |
| D792,811 S | 7/2017 | Kermani et al. | |
| D792,927 S | 7/2017 | Desberg | |
| D793,480 S | 8/2017 | Chen | |
| D793,481 S | 8/2017 | Kermani et al. | |
| D793,840 S | 8/2017 | Chen | |
| D793,841 S | 8/2017 | Kermani et al. | |
| D793,912 S | 8/2017 | Kermani | |
| D807,438 S | 1/2018 | Desberg | |
| D808,470 S | 1/2018 | Desberg | |
| D818,068 S | 5/2018 | Southard et al. | |
| D830,469 S | 10/2018 | Kermani et al. | |
| 10,266,197 B2 | 4/2019 | Desberg | |
| D852,893 S | 7/2019 | Kermani et al. | |
| D854,094 S | 7/2019 | Desberg | |
| D854,457 S | 7/2019 | Kermani | |
| D854,458 S | 7/2019 | Kermani | |
| 2002/0017418 A1 | 2/2002 | Korenjack et al. | |
| 2003/0226696 A1 | 12/2003 | Spalinski et al. | |
| 2006/0082066 A1 | 4/2006 | Woods | |
| 2006/0192355 A1 | 8/2006 | Hulden et al. | |
| 2010/0032223 A1 | 2/2010 | Kermani | |

* cited by examiner

RIDABLE KART

CROSS-REFERENCE

This application is a continuation of U.S. patent application Ser. No. 15/839,409, filed Dec. 12, 2017, which claims a priority benefit under at least 35 U.S.C. § 119 to U.S. Patent Application No. 62/434,236, filed Dec. 14, 2016, the entirety of each of which is hereby incorporated by reference herein.

BACKGROUND

Field

Embodiments of the invention relate generally to ridable vehicles and, more specifically, to a ridable kart that provides a visual effect when ridden.

Description of the Related Art

Riding on vehicles such as go karts or toy karts is a popular recreational activity. Karts have become popular among many age groups and there are many different kart variations and designs. Conventional karts generally have at least three wheels and some type of steering mechanism. Other kart designs include four or more wheels. Kart designs have also become more compact and convenient. With the increase in kart popularity, there has also been a significant increase in the demand for karts of varying sizes. There has also been an increase in the demand for karts with visual features and designs that provide visual or aesthetic effects.

It is desirable that a kart allow a rider to steer and direct the kart without the complicated steering mechanism and numerous parts required in typical steering arrangements. Also, it is desirable that some karts provide a visual effect when ridden, especially those karts intended for use by children.

SUMMARY

An aspect of one or more embodiments involves the realization that it is desirable to allow a smaller rider to ride on a kart and for the kart to provide a visual effect. An aspect of one or more embodiments of a kart is to provide the visual effect or appearance that the kart is floating or hovering above the riding surface instead of being supported by wheels that roll along the riding surface. Another aspect of one or more embodiments is that the kart can be steered simply by the rider leaning and without turning a steering wheel or handlebars. Such a steering configuration can greatly reduce the costs for manufacturing and parts. Such configurations can also make the kart more reliable and safer for use by small children. Therefore, the current arrangements in the prior art for ridable vehicles or karts are unsuitable or could be improved or made more desirable.

Preferred embodiments of a kart have a body that supports a rider. The body can include a bottom portion that supports at least a front wheel and two rear wheels. In some configurations, the wheelbase is narrower than the body so that the wheels are at least partially hidden or concealed from the view of persons observing a rider on the kart. In some configurations, the front, back and sides of the kart body define a horizontal boundary and the wheels of the kart are positioned within the horizontal boundary so that none of the wheels are visible from directly above the kart.

Some embodiments of the present kart are configured to provide a fixed front wheel and movable rear wheels to allow for steering by leaning as a user rides on the kart. Preferably, the rear wheels are supported by a motor and the motor is rotatably movable relative to the body of the kart. The kart can include a compressible material between the motor and the body that allows the motor to move relative to the body so that the rear wheels can move for steering purposes.

A preferred embodiment is a ridable vehicle or kart. The kart includes a body, comprising a top portion having a seat portion configured to receive a rider in a sitting position. The body also comprises a front portion having a front edge, a rear portion having a rear edge, a first side portion having a first side edge and a second side portion having a second side edge, wherein the first side edge, second side edge, front edge and rear edge define a horizontal boundary. The body also includes a bottom portion arranged to face a riding surface and having at least some concavity. First and second handle members are supported by the body and in a position accessible to a rider, and at least one of the first and second handle members have a switch. A front wheel is supported by the bottom portion of the body and positioned along the central longitudinal axis of the body. A motor assembly is movably supported by the bottom portion of the body so that the motor assembly can rotate relative to the body, the motor assembly including an electric motor. A first rear wheel and second rear wheel are supported by the motor assembly and driven by the electric motor, and the first rear wheel is on the same side of the kart as the first side edge and the second rear wheel is on the same side of the kart as the second side edge. The front wheel and first and second rear wheels are positioned within the horizontal boundary. A battery is supported by the bottom portion of the body and a controller is supported by the bottom portion, the battery being configured to provide power to the motor. The first rear wheel is at least partially concealed by the first side edge when viewed from the side of the kart and the second rear wheel is at least partially concealed by the second side edge when viewed from the side of the kart. The closest distance between the first side edge and the first rear wheel is greater than one inch and the closest distance between the second side edge and second rear wheel is greater than one inch.

In some configurations, the motor assembly includes a compressible material between the electric motor and the bottom portion of the body. In some configurations, the motor assembly includes a stop member and the body includes a fixed member, and the stop member interacts with the fixed member to limit the amount of movement of the electric motor relative to the body of the kart. In some configurations, the closest horizontal distance between the front wheel and the front edge is more than two inches.

In some configurations, the closest horizontal distance between the front wheel and the first side edge is more than three inches, and the closest horizontal distance between the front wheel and the second side edge is more than three inches. In some configurations, the closest distance between the first rear wheel and the rear edge is more than one inch.

In some configurations, the first handle member includes a first switch and the second handle member includes a second switch, and a rider must engage the first switch and the second switch at the same time in order for power to be transferred to the motor to drive the first and second rear wheels.

In a preferred embodiment, a ridable vehicle comprises a body having a top portion with a seat portion configured to receive a rider in a sitting position, a front portion having a front edge, a rear portion having a rear edge, a first side portion having a first side edge and a second side portion having a second side edge. The body also includes a bottom portion facing a riding surface of the ridable vehicle and first and second handle members supported by the body and in a position accessible to a rider. The vehicle also includes a front wheel supported by the bottom portion of the body, and the orientation of the front wheel is fixed relative to the body. A motor assembly is movably supported by the bottom portion of the body so that the motor assembly can rotate relative to the body, the motor assembly including an electric motor. A first rear wheel and second rear wheel are supported by the motor assembly and driven by the electric motor. The first side edge, second side edge, front edge and rear edge define a horizontal boundary, and the front wheel and first and second rear wheels are positioned within the horizontal boundary.

In some configurations, the motor can rotate relative to the body and the motor assembly includes a compressible material between the motor and the bottom portion. In some configurations, the vehicle also includes a rear axle supported by the motor assembly and operably coupled to the first and second rear wheels so that the first and second rear wheel rotate about the axle.

In some configurations, the closest distance between the first rear wheel and the closest of the first and second side edges is more than one inch. In some configurations, the closest distance between the front wheel and the closest of the first and second side edges is more than two inches. In some configurations, the body at least partially conceals the front wheel and the first and second rear wheels when viewed from the side of the ridable vehicle.

A preferred embodiment of a kart includes a body, comprising a deck portion configured to support a rider, a front edge, a rear edge, a first side edge and a second side edge, and a bottom portion facing a riding surface of the kart. The kart also includes a handle member supported by the body and in a position accessible to a rider. The kart also includes a front wheel supported by the bottom portion of the body. The kart includes a motor assembly that is movably supported by the bottom portion of the body so that the motor assembly can rotate relative to the body, and the motor assembly includes an electric motor. The kart also includes a first rear wheel and second rear wheel supported by the motor assembly and driven by the electric motor. The first side edge, second side edge, front edge and rear edge define a horizontal boundary, and the front wheel and first and second rear wheels are positioned within the horizontal boundary. The front wheel and first and second rear wheels are positioned inward from the horizontal boundary by at least one inch.

In some configurations, the motor can rotate relative to the body and the motor assembly includes a compressible material between the motor and the bottom portion. In some configurations, the kart also includes a rear axle supported by the motor assembly and operably coupled to the first and second rear wheels so that the first and second rear wheel rotate about the axle.

In some configurations, the front wheel is positioned inward from the horizontal boundary by at least two inches. In some configurations, the first and second rear wheels are positioned inward from the first and second side edges by at least 1½ inches. In some configurations, the body at least partially conceals the first and second rear wheels when the kart is viewed from the side.

BRIEF DESCRIPTION OF THE DRAWINGS

These and other features, aspects, and advantages of the present invention are described below with reference to drawings of a preferred embodiment, which is intended to illustrate, but not to limit, the present invention. The drawings contain 13 figures.

DETAILED DESCRIPTION

Figure 1:
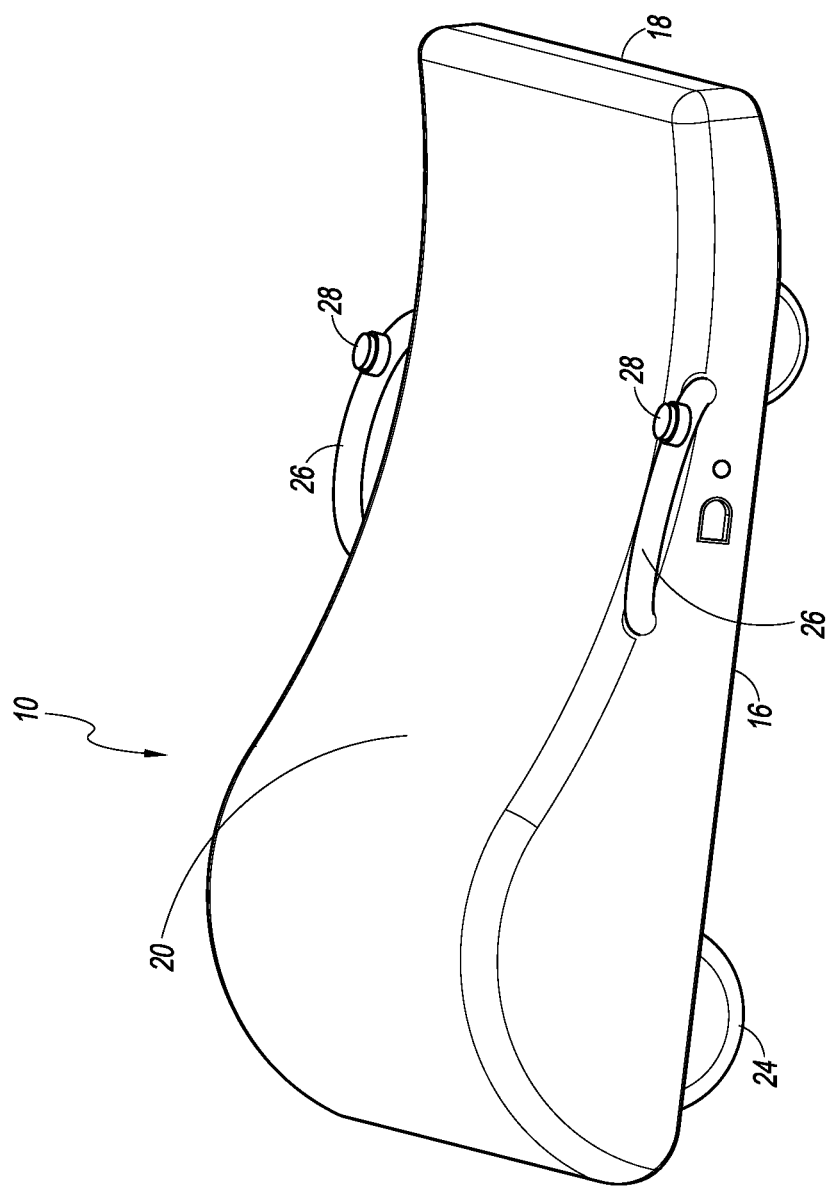
FIG. 1 is a top perspective view of an embodiment of a kart having certain features, aspects, and advantages of the present invention.
Figure 2:
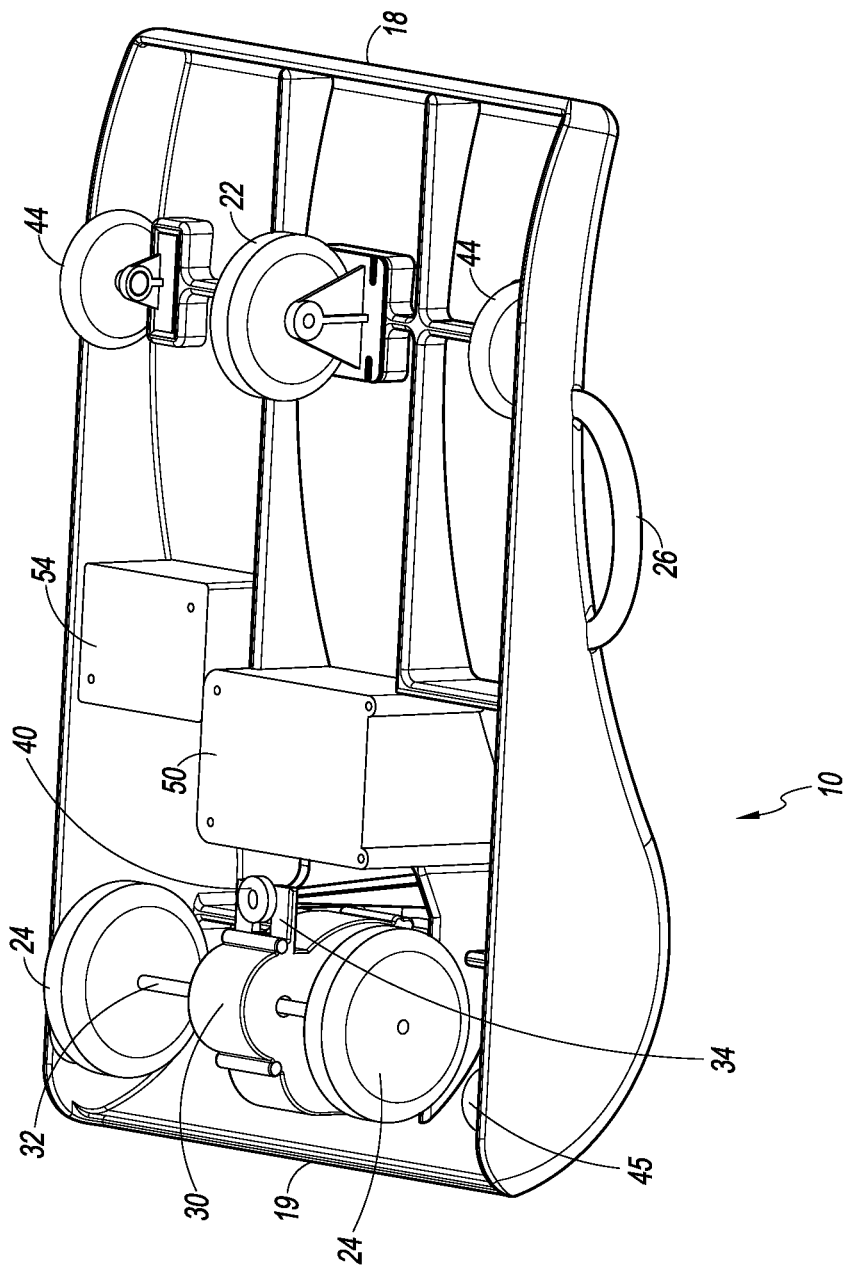
FIG. 2 is a bottom perspective view of the kart of FIG. 1.

In the following detailed description, terms of orientation such as "top", "bottom", "upward", "downward", "inward", "lower", "front", "frontward", "rear", "rearward", "outer", and "end" are used to simplify the description of the context of the illustrated embodiments. Likewise, terms of sequence, such as "first" and "second", are used to simplify the description of the illustrated embodiments. However, other orientation and sequences are possible, and the present invention should not be limited to the illustrated orientation(s). Those skilled in the art will appreciate that other orientations of the various components are possible.

For the purposes of this disclosure, embodiments of personal mobility vehicles will be referred to as "karts", but it will be understood by those with ordinary skill in the art that the present invention extends beyond the specifically disclosed embodiments and references to karts to other alternative embodiments and/or uses of the invention and modifications and equivalents thereof. In particular, while the present vehicles and related methods have been described in the context of particularly preferred embodiments as it relates to karts, the skilled artisan will appreciate, in view of the present disclosure, that certain advantages, features and aspects of the systems and methods may be realized in a variety of other applications, including personal mobility vehicles other than karts with different arrangements of front and rear wheels, for example, scooters, skates and other riding applications.

In a preferred embodiment, a kart includes a body or base having a rear end and a front end. The body includes a deck and a seat portion that is configured to receive a seated rider. The body supports a front wheel and at least two rear wheels. The body includes a front edge, a rear edge, and side edges that define a horizontal outer boundary. The front wheel and the rear wheels are positioned within the horizontal boundary and underneath the body. Preferably, the edges of the body conceal or obscure at least a substantial portion or an entirety of the front and/or rear wheels when viewed from the side or slightly above the direct side view. Similarly, the edges of the body preferably conceal or obscure at least a substantial portion or an entirety of the front and/or rear wheels when viewed from the front or rear, or slightly above the direct front or rear views. Embodiments of the kart are described below with reference to FIGS. 1 through 7. In the illustrated arrangements, the kart includes a front wheel and two rear wheels, however, arrangements in which the illustrated arrangement is reversed or in which the kart has multiple front wheels and multiple rear wheels are also possible. It is also contemplated that the kart has only a single front wheel and a single rear wheel.

FIGS. 1 through 5 illustrate a kart having certain features, aspects and advantages of the present invention. The kart includes a body 10, which includes a deck with a seat portion 20 configured to allow a rider to be seated thereon. The body 10 preferably is relatively flat and elongate. In some configurations, the body 10 has a relatively low height in comparison to its length or its width. For example, the height of the body 10 can be less than or equal to about one-half of the length or the width. In some configurations, the height of the body 10 is less than about 24 inches, less than about 18 inches or less than about 12 inches. Such arrangements can provide the kart with the appearance of a relatively flat vehicle or object that "floats" or "hovers" above the surface over which it is operated. For example, the body 10 can be shaped to resemble a magic carpet or a hovercraft. In some configurations, the body 10 is configured such that the user is seated on the kart with his or her feet forward of the seat portion 20 and at or near a level of the seat portion 20. In other words, the body 10 is configured to place the user close to the ground without the user having his or her feet significantly below the seat portion 20.

The body supports at least one front wheel 22. The body 10 also supports at least one rear wheel 24. In a preferred embodiment, the body 10 supports two rear wheels 24 and in other embodiments it can support more than two rear wheels. The rear wheels 24 are coupled to the bottom of the body 10. In some embodiments, the rear wheels 24 are movably coupled to the body so that they can move relative to the body 10 in addition to being able to rotate about their wheel axes. Preferably, the rear wheels 24 are located below the body 10 and toward a rearward end of or behind the seat portion 20. In some embodiments, the body 10 curves upward or extends upward at its rear end behind the seat portion 22.

Preferably, the body 10 also includes at least one handle member 26 accessible to a rider while the rider is seated on the kart. In some embodiments, the kart includes two handle members 26, one adjacent to each side of the kart. Preferably, the handle members 26 each include a button, switch or other user control 28 that controls the power delivered to the rear wheels. Preferably, the switches or buttons 28 on the handle members 26 are configured so that a rider must press or engage both switches or buttons 28 at the same time in order to allow power to be delivered to the rear wheels. This provides additional safety to the kart for young children because it encourages or requires a rider to have both hands on the handle members 26 in order to provide power to the rear wheels 24 which makes the kart move. In other embodiments, only one of the handle members includes a button or switch to control the power. The buttons 28 are positioned on the handle members at a location that is accessible to the hands of a rider.

The kart also includes a motor assembly having a motor 30. The motor 30 can be of any suitable arrangement. For example, one such arrangement can be a hub motor, such as that shown and described in Applicant's U.S. Publication No. 2015/0133253 or application Ser. No. 14/709,916, filed May 12, 2015, the entireties of which are incorporated by reference herein. In such an arrangement, the motor 30 can drive either of the front or rear wheels 22, 24. Preferably, the motor 30 is an electric motor that is powered by a battery 50. The battery 50 is supported by the bottom portion of the body 10 and is a rechargeable battery. Preferably, the battery 50 is operably coupled, by wiring or otherwise, to a controller 54 that is also supported by the bottom portion of the body 10. The controller 54 is configured to control the power delivered from the battery 50 to the motor 30. Preferably, the controller 54 includes an on/off switch and is operably coupled to the button 28 of at least one of the handle members 26. The controller 54 can allow power to be delivered from the battery 50 to the motor 30 and rear wheels 24 when one or both of the buttons 28 are engaged by the rider. As shown, the battery 50 is positioned forward or more towards the front portion of the body 10 than the motor assembly and motor 30. The motor is positioned adjacent the rear portion of the body 10 and between the rear wheels 24.

As illustrated, the motor assembly and motor 30 support an axle 32 that supports the rear wheels 24. Preferably, the axle 32 passes through a portion of the motor 30 and includes a gear or sprocket that is driven by the motor 30. The motor assembly and motor 30 are coupled to the bottom portion of the body 10 in a way that allows the motor 30 to move relative to the body 10. Preferably, the motor 30 can rotate relative to the body 10 and the rear wheels 24 can each move fore and aft relative to the body 10. The motor assembly includes a stop member 34 and the body 10 includes a fixed member 40. The stop member 34 extends from the motor assembly or motor 30 and engages the fixed member 40 in order to limit the amount or type of movement of the motor 30 relative to the body 10. Preferably, the stop member 34 contacts the fixed member 40 when the motor 30 rotates to a certain degree relative to the body 10. This can limit the amount of rotational movement of the motor 30 relative to the body 10.

Preferred embodiments of the kart can also include anti-sway or anti-roll members 44 supported by the bottom portion of the body 10. The anti-sway members 44 are configured so that they do not contact the riding surface when the kart is in normal operation. In other words, when the kart is horizontal and supported by the front wheel 22 and rear wheels 24, the anti-sway members 44 extend from the body 10 to a point above the riding surface and do not influence the driving or movement of the kart. When the kart inclines to a certain angle side to side, one of the anti-sway members 44 will touch the riding surface so as to prevent the kart from further inclination and possible toppling. The anti-sway configuration is particularly advantageous for vehicles provided with only one front wheel 22. The selected distance from the anti-sway members 44 to the riding surface is designed on the basis of a desired anti-sway angle. The anti-sway members 44 can be wheels, as illustrated, or they can also be pillars or blocks or other stop members that can slide along the riding surface if necessary. The anti-sway members 44 are also preferably at least partially concealed by the body 10 when the kart is viewed from the side. In some embodiments, the kart also includes a second set of anti-sway members supported by the body 10 toward the rear of the body 10.

The kart has a body 10 that includes a front portion with a front edge 18 and a rear portion with a rear edge 19. The body 10 also includes a first side portion with a first side edge 16 and a second side portion with a second side edge 17. Preferably, these edges are the outer edges or outer most portions of the body 10, and the front edge 18, rear edge 19, and side edges 16 and 17 define an outer horizontal boundary of the body 10. It is not required that the edges be straight or have a certain curvature. Instead, the edges can have any shape or profile and still define the outer horizontal boundary of the body. Preferably, each of the front and rear wheels 22 and 24 are positioned within this horizontal boundary defined by the front, rear and side edges 16, 17, 18, 19. Each of the wheels 22 and 24 can have a closest distance to each of the edges, the closest distance being the measured distance or space between the portion of the edge closest to the wheel and the portion of the wheel closest to the edge.

Figure 3:
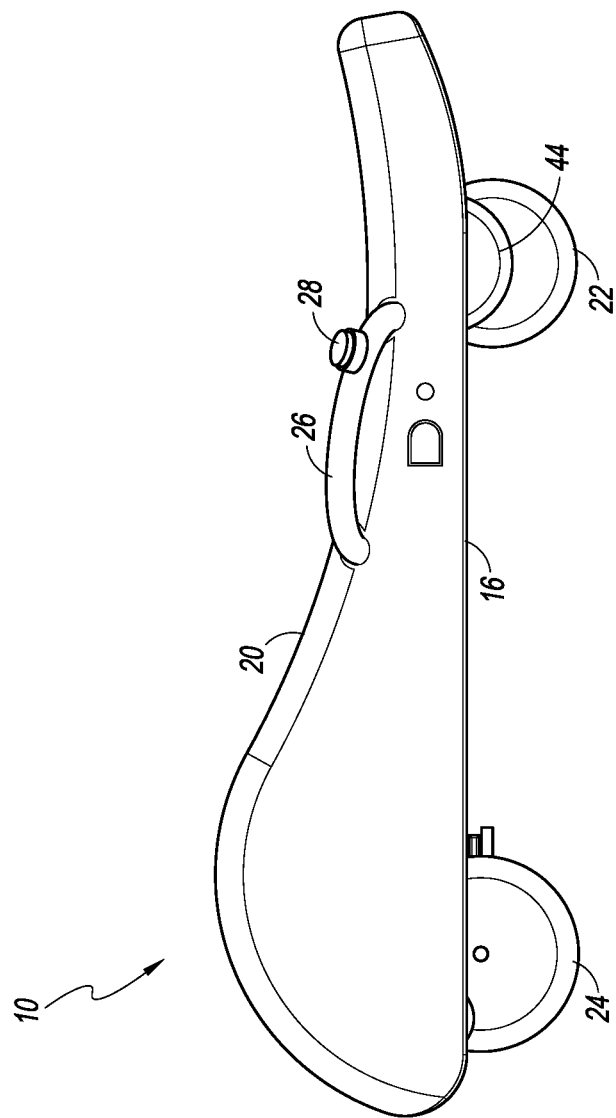
FIG. 3 is a side view of the kart of FIG. 1.

The body 10 can also have a concave space within the horizontal boundary defined by the edges. This concave space or area can be defined by a body 10 that curves downward at its outer edges, or it can be a concave space or recess in an otherwise flat or convex bottom portion of the body 10. The motor 30, rear wheels 24 and front wheel can be supported within this concave space so that they are at least partially concealed by the body 10 when the kart is viewed from a directly horizontal side view or from an angle higher than the horizontal side view. As shown in FIG. 3, when viewed from the side, the body 10 conceals at least the top portions of the front wheel 22 and the rear wheels 24. The illustrated body 10 also conceals the majority of the anti-sway members 44.

Preferably, the edges 16, 17, 18, 19 are spaced from the ground or other surface upon which the kart is operated a distance sufficient to provide the appearance of the kart "floating" or "hovering" above the surface, but are located close enough to the ground or other surface so that the wheels 22, 24 that support the kart under normal operation can be hidden or obscured by the body 10. That is, the anti-sway members 44, 45 are not necessarily obscured, although they may be in some configurations. In some configurations, the edges 16, 17, 18, 19 are spaced at least about 1 inch from the ground or other surface. In some configurations, the edges 16, 17, 18, 19 are spaced at least 2 inches from the ground or other surface. In some configurations, the edges 16, 17, 18, 19 are spaced between about 2-4 inches from the ground or other surface. In some configurations, some or all of the wheels 22, 24 that support the kart under normal operation are inset from one or more of the edges 16, 17, 18, 19 a distance of at least about 1-3 times a height of that edge 16, 17, 18, 19 from a flat surface upon which the kart rests. The wheel(s) 22, 24 can be inset from a portion of the edge 16, 17, 18 19 that is adjacent the wheel 22, 24 at least about 1-3 times the height of that portion of the edge 16, 17, 18, 19 from the flat surface upon which the kart rests.

Figure 4:
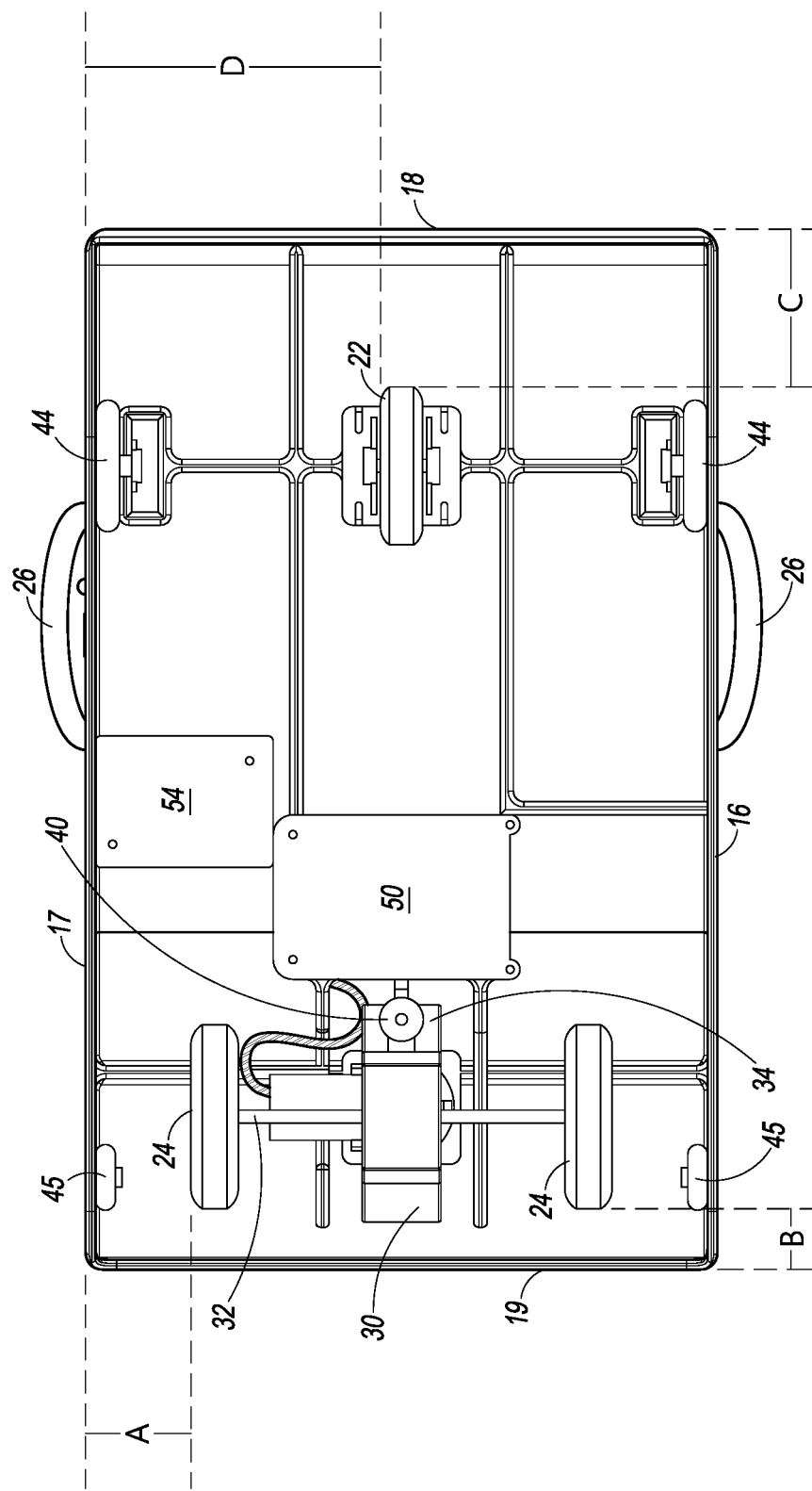
FIG. 4 is a bottom view of the kart of FIG. 1.

With reference to FIG. 4, measurement or distance A defines the closest distance between the rear wheel 24 closest to the second side edge 17. This can be the same distance as the distance from the rear wheel 24 closest to the first side edge 16. Distance A is preferably sufficient to create the appearance that the kart is "floating" or "hovering" about the ground or surface upon which the kart rests. In some configurations, distance A is sufficient to allow the body 10 to conceal or obscure a substantial portion or an entirety of some or all of the wheels 22, 24 that support the kart under normal operation. That is, the anti-sway members 44, 45 are not necessarily obscured, although they may be in some configurations. In some configurations, the distance A is greater than zero and in some embodiments can be any distance between zero and ten inches. In other embodiments, the distance A is approximately three inches or greater. In the illustrated embodiment, the distance A is between approximately two and three inches. In yet another embodiment, the distance A is between three and five inches. The distance A can be at least 15%, 20% or 25% of a width of a portion of the body 10, such as a portion at or near the relevant wheel 24.

Measurement or distance B defines the closest distance between the rear wheel 24 and the rear edge 19. Distance B is preferably greater than zero and in some embodiments can be any distance between zero and ten inches. In other embodiments, the distance B is three inches or greater. In the illustrated embodiment, the distance B is between approximately one and two inches. In yet another embodiment, the distance B is between approximately two and five inches. The distance B can be at least 5%, 15% or 25% of a length of a portion of the body 10, such as a portion at or near the relevant wheel 24.

Measurement or distance C defines the closest distance between the front wheel 22 and the front edge 18. Distance C is preferably greater than zero and in some embodiments can be any distance between zero and ten inches. In other embodiments, distance C is approximately three inches or greater. In the illustrated embodiment, distance C is between approximately three and four inches. In yet another embodiment, distance C is between approximately four and eight inches. The distance C can be at least 15%, 20% or 25% of a length of a portion of the body 10, such as a portion at or near the relevant wheel 24.

Measurement of distance D defines the closest distance between the front wheel 22 and the second side edge 17. This can be the same distance as the closest distance from the front wheel 22 to the first side edge 16. Distance D is preferably greater than zero and in some embodiments can be any distance between zero and twenty inches. In other embodiments, distance D is approximately four inches or greater. In the illustrated embodiment, distance D is between approximately four and six inches. In yet another embodiment, distance D is between approximately six and ten inches. The distance D can be at least 15%, 30% or 45% of a width of a portion of the body 10, such as a portion at or near the relevant wheel 22.

In the illustrated embodiment, the front wheel 22 is positioned along the central longitudinal axis of the kart and body 10. Preferably, the front wheel 22 is supported by the body 10 and is fixed relative to the body 10 so that it does not move significantly relative to the body, other than the wheel rotating about its axis. Preferably, the front wheel 22 is pointed in the straight forward direction and does not change orientation relative to the body 10. In other preferred embodiments, the front wheel 22 is configured to pivot and rotate relative to the body 10 in order to assist in steering the kart.

Figure 5:
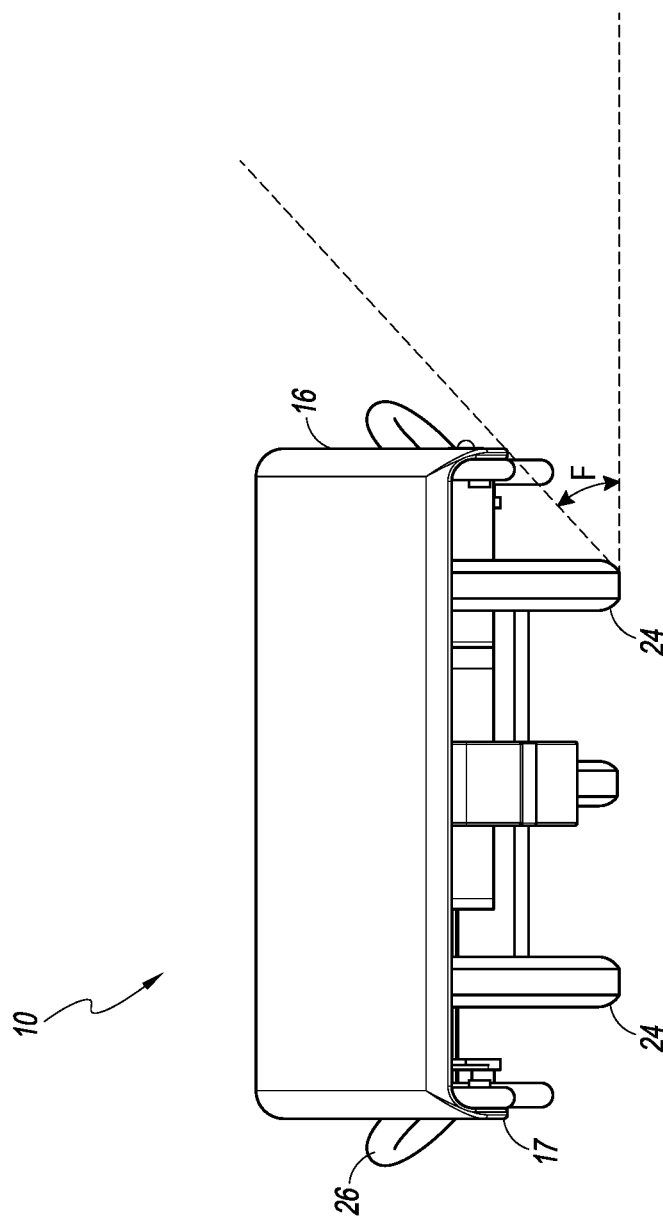
FIG. 5 is a rear view of the kart of FIG. 1.

With reference to FIG. 5, embodiments of the kart are configured so that the rear wheels 24 or front wheel 22 are not visible when the kart is viewed at a certain angle above horizontal, such as a flat surface on which the wheels 22, 24 that support the kart during normal operation rest. For example, angle F illustrates the angle relative to horizontal at which the rear wheel 24 is no longer visible. This angle could be the same for both rear wheels 24 and their visibility beneath the body 10. A similar angle could be illustrated for the front wheel 22 showing the angle relative to horizontal at which the front wheel 22 is not visible from the side of the kart. Preferably, angle F is equal to or less than 80 degrees. In some embodiments, angle F is between 80 degrees and 20 degrees. In other embodiments, angle F is approximately 20 degrees or less. In the illustrated embodiment, angle F is between approximately 30 degrees and 60 degrees and closer to 45 degrees. The corresponding angle for the front wheel 22 is preferably less than or equal to 70 degrees and in certain preferred embodiments is less than angle F. In the illustrated embodiment, the corresponding angle for the front wheel 22 is between approximately 10 and 40 degrees and is closer to about 20 degrees. The angle F is shown with respect to one side, but can equally apply to the other side and to the front and rear sides of the kart.

Figure 6:
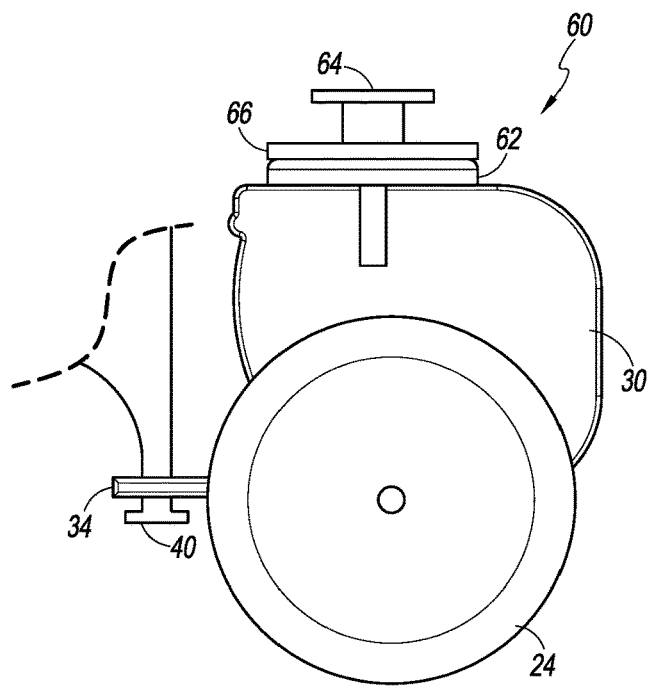
FIG. 6 is a side view of a motor assembly for a kart having certain features, aspects, and advantages of the present invention.
Figure 7:
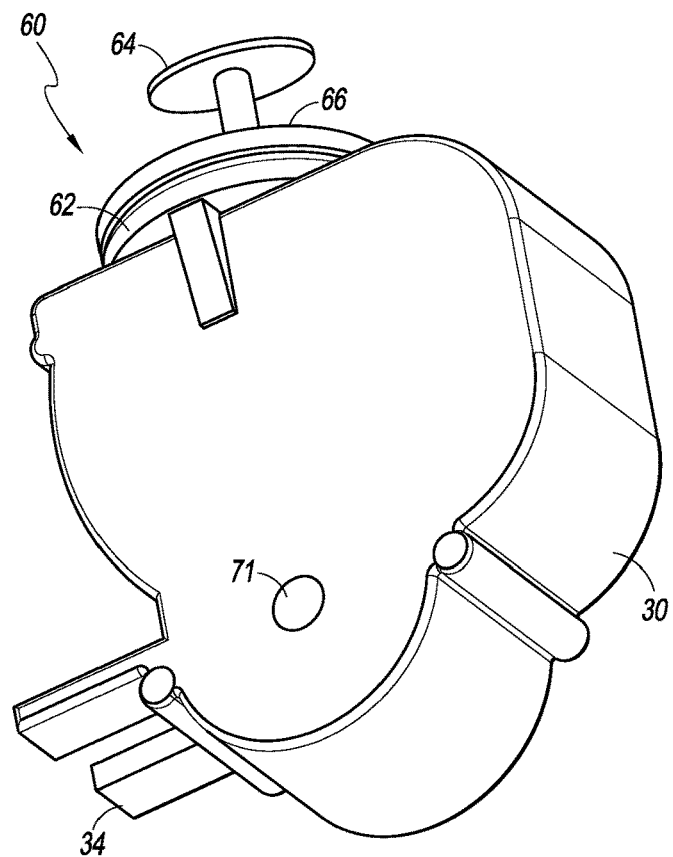
FIG. 7 is a perspective view of the motor assembly of FIG. 6.
Figure 8:
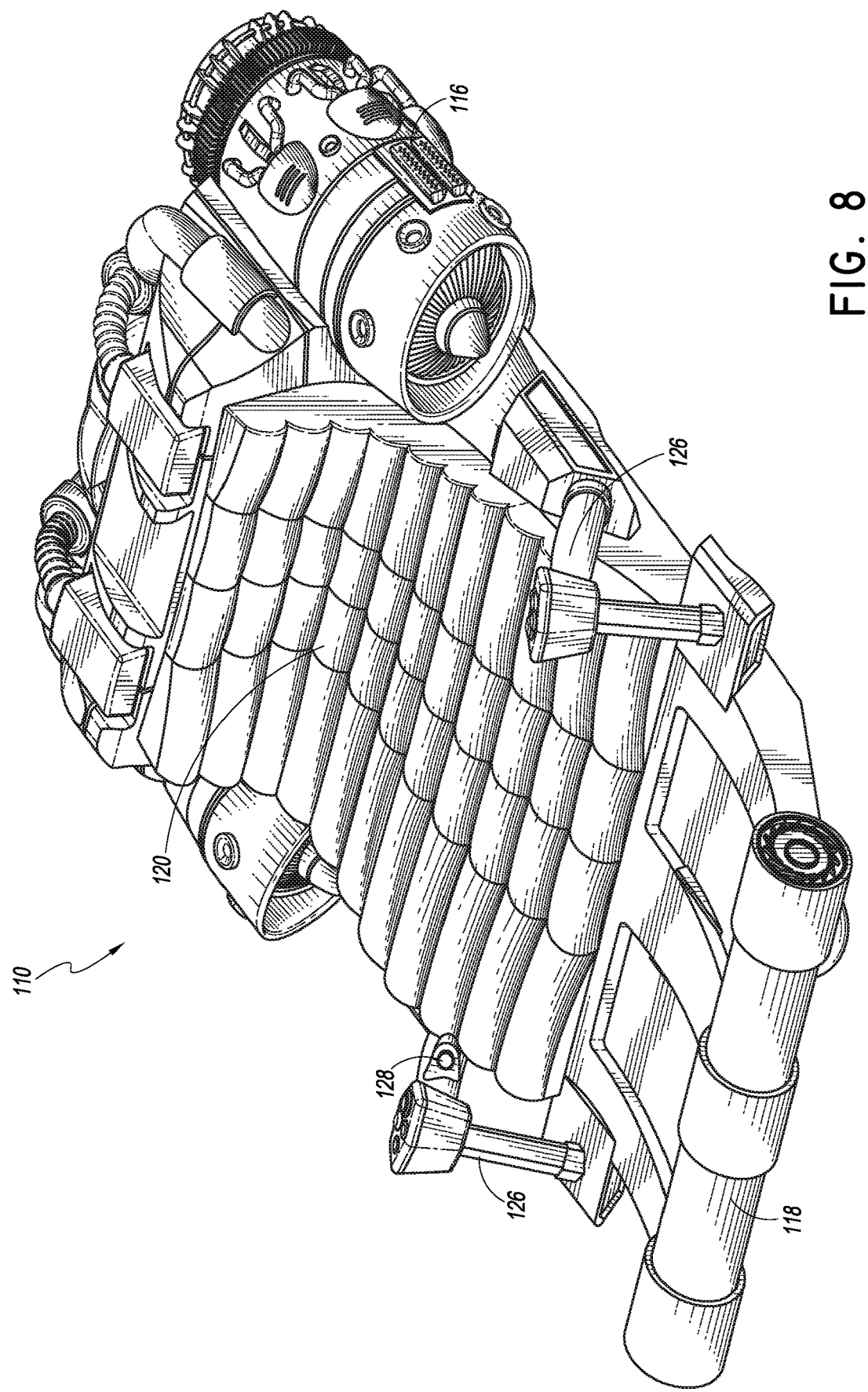
FIG. 8 is a perspective view of a kart having certain features, aspects, and advantages of the present invention.

FIGS. 6 and 7 illustrate an embodiment of a motor assembly that can be supported by the body 10 and configured to drive the rear wheels 24. The motor assembly includes a motor 30 that is preferably an electric motor, but could be another type of motor such as a gas motor. The motor 30 can include an opening 71 that receives an axle between the rear wheels 24. The motor assembly also includes a stop member 34 that extends away from the motor 30 and is sized and shaped to engage a fixed member 40 on the body 10 of the kart. Preferably, the stop member 34 has two prongs and a slot between the two prongs through which the fixed member 40 can pass. Such an arrangement limits the amount of rotational movement of the motor 30 relative to the body 10 as the prongs of the stop member 34 engage the fixed member 40.

The motor assembly also includes an attachment assembly that couples the motor 30 to the body 10. The attachment assembly includes a coupling portion 64 that couples the motor 30 to the body 10. Preferably, the coupling portion 64 extends through at least a portion of the body 10 and is securely attached to the motor 30. The motor assembly also includes a rigid portion 66 that is positioned between the motor 30 and the body 10. In some preferred embodiments, the motor assembly further includes a compressible member 62 positioned between the motor 30 and the body 10. The compressible member 62 is configured to allow the motor 30 to be securely coupled to the body 10 and still permit the motor 30 to move relative to the body 10. For example, the compressible member 62 can be compressed by portions of the motor 30 to allow the motor 30 to tilt or rotate relative to the body 10. This tilting and/or rotating of the motor 30 can also allow the rear wheels to tilt and/or rotate so that a rider can steer the kart by leaning from side to side. For example, when a rider tilts to the left, the left portion of the compressible material 62 is compressed and the body 10 can tilt relative to the rear wheels 24 and the rear wheels 24 can rotate slightly to allow turning of the kart towards the left. The compressible member 62 can be made from any compressible material. For example, it could be made from rubber, silicon, gel, liquid, or any other material that allows the member to be compressed enough to allows movement of the motor 30 relative to the body 10.

FIGS. 8 through 13 illustrate another embodiment of a kart having certain features, aspects and advantages of the present invention. The kart includes a body 110 that has a deck with seat portion 120 configured to allow a rider to be seated thereon. The body supports a front wheel 122 and two rear wheels 124. The rear wheels 124 are coupled to the bottom of the body 110. Preferably, the rear wheels 124 are movably coupled to the body 110 so that they can move relative to the body 110 in addition to being able to rotate about their wheel axes. Preferably, the rear wheels 124 are located below the body 110 and toward a rearward end of or behind the seat portion 120. The body 110 also includes two handle members 126 accessible to a rider while the rider is seated on the kart. The handle members 126 each include a button or switch 128 that controls the power delivered to the rear wheels 124. Preferably, the switches or buttons 128 on the handle members 126 are configured so that a rider must press or engage both switches or buttons 128 at the same time in order to allow power to be delivered to the rear wheels. The buttons 128 are positioned on the handle members at a location that is accessible to the hands of a rider.

The kart also includes a motor assembly having a motor 130. Preferably, the motor 130 is an electric motor that is powered by a rechargeable battery (not shown). Preferably, the battery is operably coupled, by wiring or otherwise, to a controller (not shown) that is also supported by the bottom portion of the body 110. The controller is configured to control the power delivered from the battery to the motor 130.

As illustrated, the motor assembly supports an axle 132 that supports the rear wheels 124. Preferably, the axle 132 passes through a portion of the motor 130 and includes a gear or sprocket that is driven by the motor 130. Preferably, the motor assembly and motor 130 are coupled to the bottom portion of the body 110 in a way that allows the motor 130 and rear wheels 124 to move relative to the body 110, as described with regard to the previous embodiments. Although not shown in these figures, the motor assembly and motor 130 can be coupled in a similar or same manner as the embodiments described above with a compressible member and stop member to both allow and limit the relative movement between the motor 130 and the body 110. Preferably, the motor 130 can rotate relative to the body 110 and each of the rear wheels 124 can move fore and aft relative to the body 110. The motor assembly can also include a stop member and fixed member to limit the amount of relative movement between the motor 130 and the body 110, as described in the previous embodiments. The kart can also include anti-sway or anti-roll members supported by the bottom portion of the body 110, as described in the previous embodiments.

Figure 11:
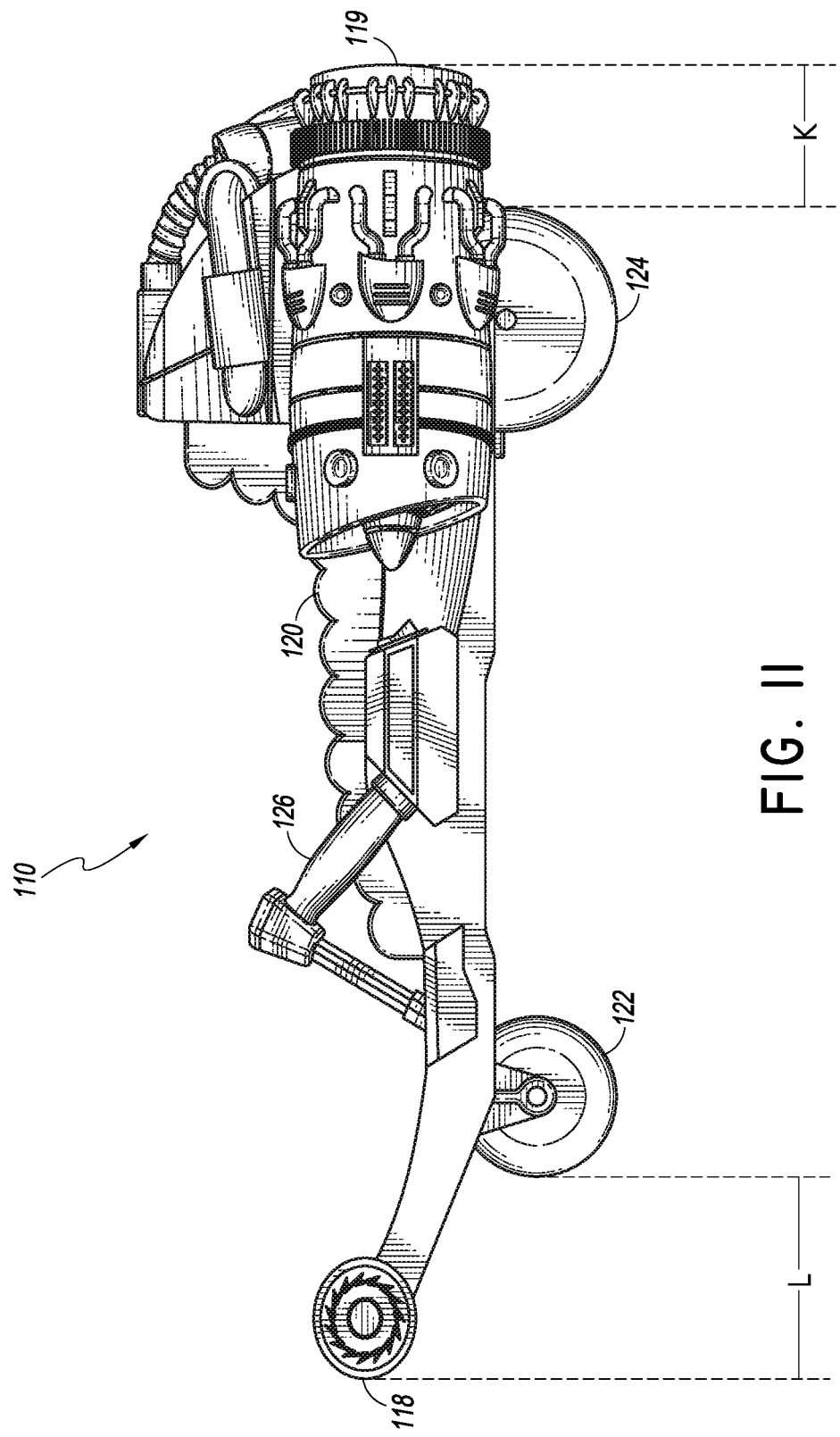
FIG. 11 is a side view of the kart of FIG. 8.
Figure 12:
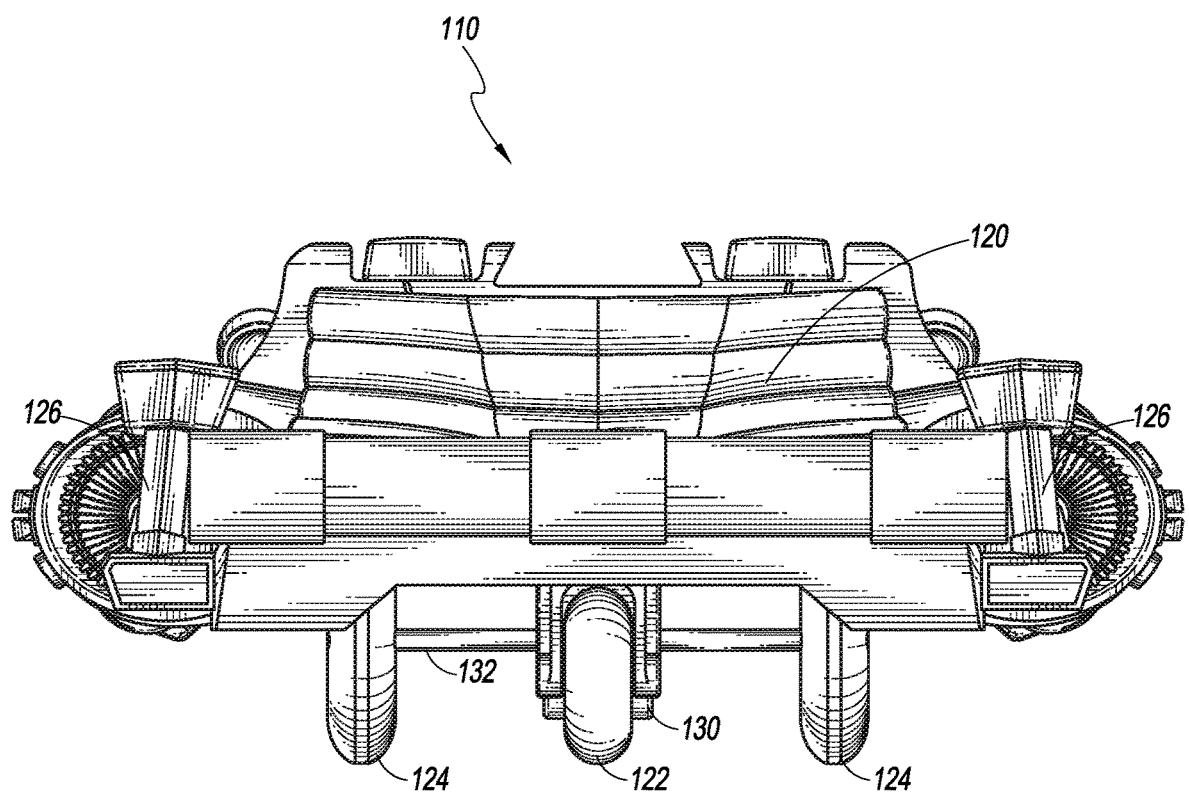
FIG. 12 is a front view of the kart of FIG. 8.

The body 110 includes a front portion with a front edge 118 and a rear portion with a rear edge 119. The body 110 also includes a first side portion with a first side edge 116 and a second side portion with a second side edge 117. Preferably, these edges are the outer edges or outer most portions of the body 110, and the front edge 118, rear edge 119, and side edges 116 and 117 define an outer horizontal boundary of the body 110. Each of the front and rear wheels 122 and 124 are positioned within this horizontal boundary defined by the front, rear and side edges 116, 117, 118, 119. Each of the wheels 122 and 124 have a closest distance to each of the edges, the closest distance being the measured distance or space between the portion of the edge closest to the wheel and the portion of the wheel closest to the edge. The body 110 has a concave space within the horizontal boundary defined by the edges. The motor 130, rear wheels 124 and front wheel 122 are supported within this concave space so that they are at least partially concealed by the body 110 when the kart is viewed from a directly horizontal side view or from an angle higher than the horizontal side view. As shown in FIG. 11, when viewed from the side, the body 110 conceals at least the top portions of the front wheel 122 and the rear wheels 124.

Figure 9:
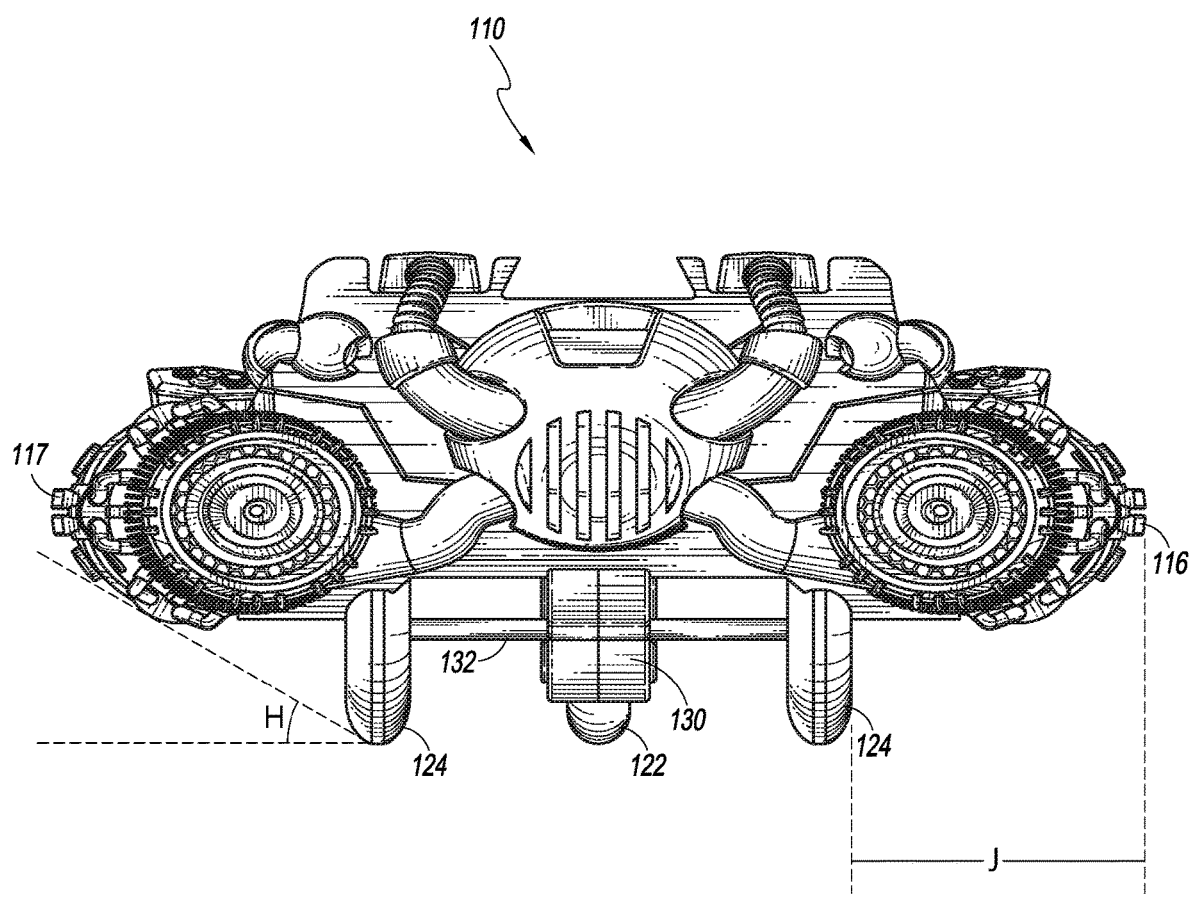
FIG. 9 is rear view of the kart of FIG. 8.
Figure 10:
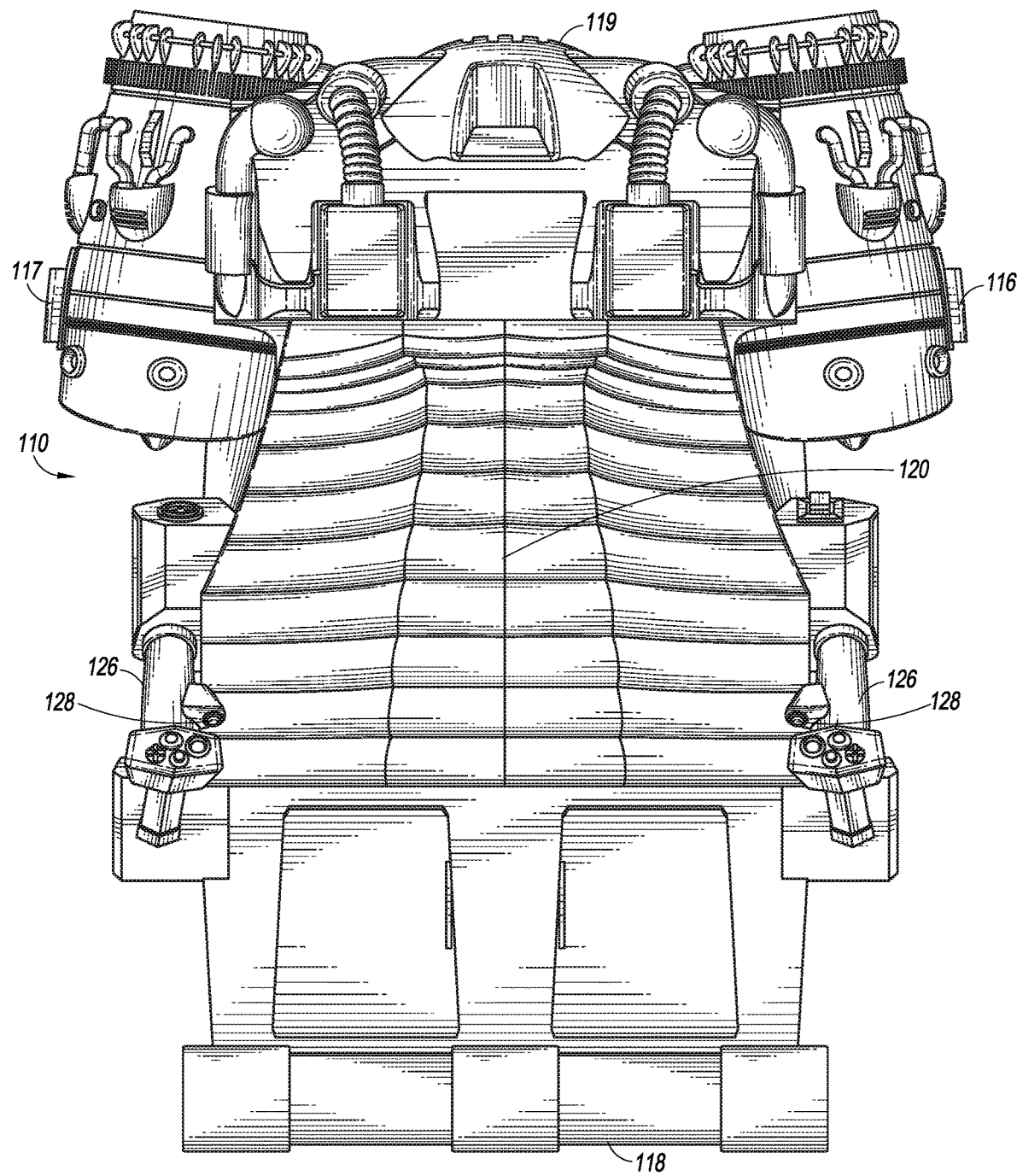
FIG. 10 is top view of the kart of FIG. 8.
Figure 13:
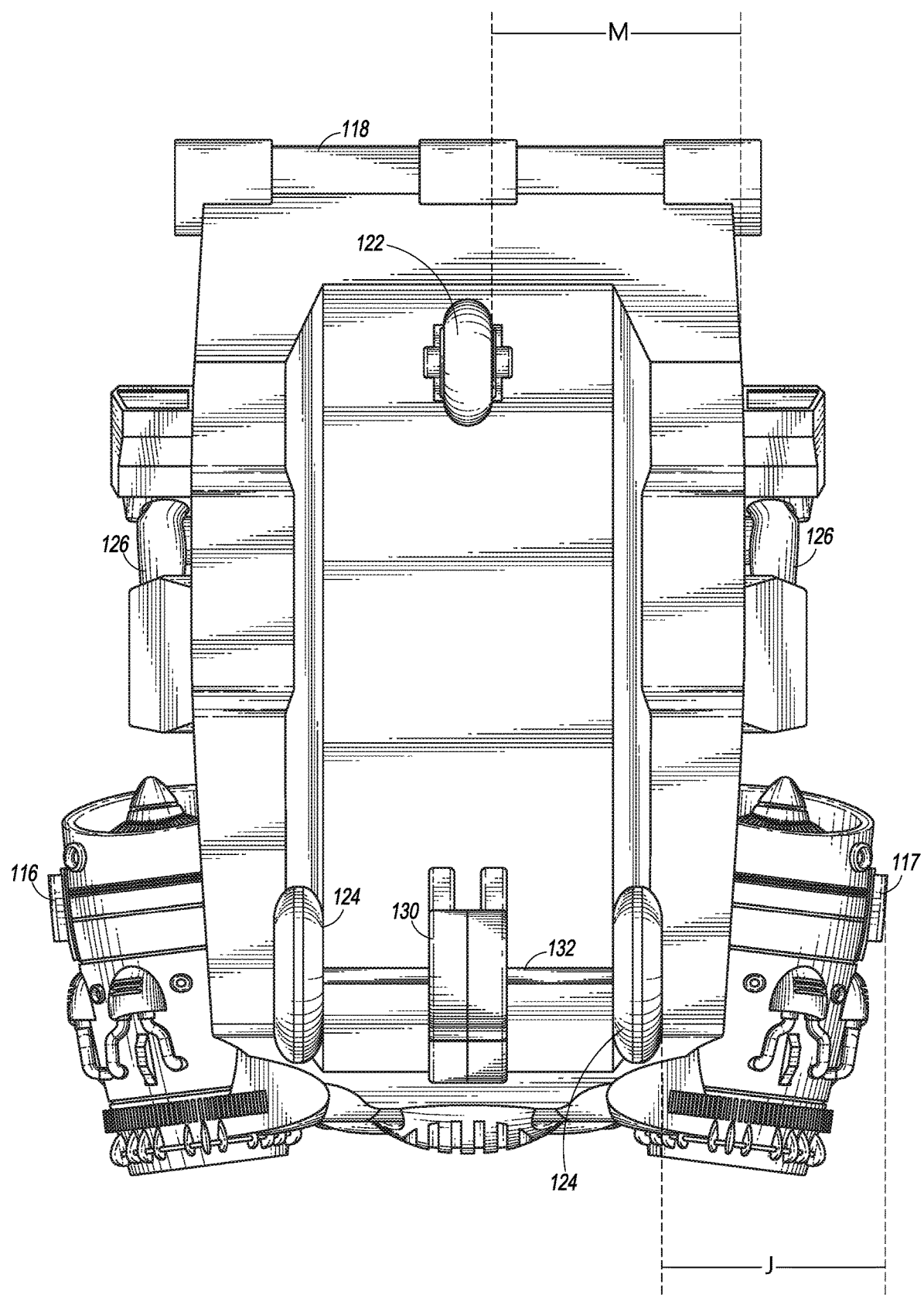
FIG. 13 is a bottom view of the kart of FIG. 8.

With reference to FIGS. 9, 11 and 13, measurement or distance J defines the closest distance between the rear wheel 124 closest to the first side edge 116 and the first side edge 116. This can be the same distance as the distance from the rear wheel 24 closest to the second side edge 117 and the second side edge 117. Distance J is preferably greater than zero and in some embodiments can be any distance between zero and ten inches. In other embodiments, the distance J is approximately three inches or greater. In the illustrated embodiment, the distance J is between approximately four and six inches. Measurement or distance K defines the closest distance between the rear wheel 124 and the rear edge 119. Distance K is preferably greater than zero and in some embodiments can be any distance between zero and ten inches. In other embodiments, the distance K is three inches or greater. In the illustrated embodiment, the distance K is between approximately one and three inches.

Measurement or distance L defines the closest distance between the front wheel 122 and the front edge 118. Distance L is preferably greater than zero and in some embodiments can be any distance between zero and ten inches. In other embodiments, distance L is approximately three inches or greater. In the illustrated embodiment, distance L is between approximately two and four inches. Measurement of distance M defines the closest distance between the front wheel 122 and the second side edge 117. This can be the same distance as the closest distance from the front wheel 122 to the first side edge 116. Distance M is preferably greater than zero and in some embodiments can be any distance between zero and twenty inches. In other embodiments, distance M is approximately four inches or greater. In the illustrated embodiment, distance M is between approximately four and six inches.

In the illustrated embodiment, the front wheel 122 is positioned along the central longitudinal axis of the kart and body 110. Preferably, the front wheel 122 is supported by the body 110 and is fixed relative to the body 110 so that it does not move significantly relative to the body, other than the wheel rotating about its axis. Preferably, the front wheel 122 is pointed in the straight forward direction and does not change orientation relative to the body 110.

With reference to FIG. 9, the kart is configured so that the rear wheels 124 or front wheel 122 are not visible when the kart is viewed at a certain angle above the horizontal. For example, angle H illustrates the angle relative to horizontal at which the rear wheel 124 is no longer visible. This angle could be the same for both rear wheels 124 and their visibility beneath the body 110. A similar angle could be illustrated for the front wheel 122 showing the angle relative to horizontal at which the front wheel 122 is not visible from the side of the kart. Preferably, angle H is equal to or less than 80 degrees. In some embodiments, angle H is between 80 degrees and 20 degrees. In other embodiments, angle H is approximately 20 degrees or less. In the illustrated embodiment, angle H is between approximately 20 degrees and 60 degrees and closer to 35 degrees. The corresponding angle for the front wheel 122 is preferably less than 70 degrees and in certain preferred embodiments is less than angle H. In the illustrated embodiment, the corresponding angle for the front wheel 122 is between approximately 10 and 40 degrees and is closer to 25 degrees.

Although the embodiments of the invention presented herein have been disclosed in the context of certain preferred embodiments and examples, it will be understood by those skilled in the art that the invention extends beyond the specifically disclosed embodiments to other alternative embodiments and/or uses of the invention and obvious modifications and equivalents thereof. Thus, it is intended that the scope of the invention herein disclosed should not be limited by the particular embodiments described above, but should be determined only by a fair reading of the claims that follow.

What is claimed is:

1. A ridable vehicle comprising:
    a body, comprising:
        a top portion having a seat portion configured to receive a rider in a seated position;
        a front portion having a front edge;
        a rear portion having a rear edge;
        a first side portion having a first side edge and a second side portion having a second side edge; and
        a bottom portion configured to face a riding surface;
    a first and a second handle member, each of the first and second handle members coupled to the body and in a position accessible to the rider;
    a first and a second front wheel coupled to the bottom portion of the body;
    a motor assembly including a motor;
    a rear wheel configured to be driven by the motor;
    a battery configured to provide power to the motor; and
    a plurality of outrigger wheels positioned laterally outward of the rear wheel, wherein the plurality of outrigger wheels are spaced apart from the riding surface when the vehicle is moving in a straight line and the riding surface is flat;
    wherein the vehicle is configured to be steered by the rider leaning, without turning a steering wheel.

2. The vehicle of claim 1, further comprising a switch disposed on the body, wherein the switch is configured to control the power delivered to the motor.

3. The vehicle of claim 2, wherein the switch is disposed on at least one of the first and second handle members.

4. The vehicle of claim 1, wherein the body has a height and a width and the height of the body is less than or equal to one-half of the width of the body.

5. The vehicle of claim 1, wherein the rear wheel is disposed below the body and behind the seat portion.

6. The vehicle of claim 1, wherein the body curves upward at the rear portion.

7. The vehicle of claim 1, wherein the first side edge, second side edge, front edge, and rear edge define a horizontal boundary, and the front wheels are positioned within the horizontal boundary.

8. The vehicle of claim 7, wherein the rear wheel is coupled to the motor assembly and positioned within the horizontal boundary.

9. The vehicle of claim 1, wherein the rear wheel is at least partially concealed by the first side edge when viewed from a side of the vehicle.

10. The vehicle of claim 1, wherein the motor assembly is rotatable relative to the body and includes a compressible material between the motor and the bottom portion of the body.

11. A ridable vehicle comprising:
    a body, comprising:
        a top portion having a seat portion configured to receive a rider in a seated position;
        a front portion having a front edge;
        a rear portion having a rear edge;
        a first side portion having a first side edge and a second side portion having a second side edge; and
        a bottom portion configured to face a riding surface;
    a first and a second handle member, each of the first and second handle members coupled to the body and in a position accessible to the rider;
    a front wheel coupled to the bottom portion of the body;
    a motor assembly including a motor;
    a rear wheel configured to be driven by the motor;
    a first and second outrigger wheel, each of the first and second outrigger wheels positioned laterally outward of the front wheel and the rear wheel; and
    a battery configured to provide power to the motor;
    wherein a diameter of the rear wheel is larger than a diameter of each of the front wheel and the first and second outrigger wheels.

12. The vehicle of claim 11, wherein the diameter of each of the first and second outrigger wheels is smaller than the diameter of the front wheel.

13. The vehicle of claim 11, wherein when the vehicle is moving in a straight line and the riding surface is flat, the first and second outrigger wheels are spaced apart from the riding surface.

14. The vehicle of claim 11, further comprising a switch disposed on the body, wherein the switch is configured to control the power delivered to the motor.

15. The vehicle of claim 11, wherein the rear wheel is disposed below the body and behind the seat portion.

16. The vehicle of claim 11, wherein the body curves upward at the rear portion.

17. A ridable vehicle comprising:
   a body having a height and a width, the body comprising:
      a top portion having a seat portion configured to receive a rider in a seated position;
      a front portion having a front edge;
      a rear portion having a rear edge;
      a first side portion having a first side edge and a second side portion having a second side edge; and
      a bottom portion configured to face a riding surface;
      wherein a peripheral flange extends downwardly along at least the first and second side edges;
   a first and a second handle member, each of the first and second handle members coupled to the body and in a position accessible to the rider;
   a front wheel coupled to the bottom portion of the body;
   a motor assembly including a motor;
   a rear wheel configured to be driven by the motor;
   a battery configured to provide power to the motor; and
   a plurality of outrigger wheels positioned laterally outward of the front wheel and the rear wheel, wherein the plurality of outrigger wheels are spaced apart from the riding surface when the vehicle is moving in a straight line and the riding surface is flat;
   wherein the body is configured to receive the rider's feet at a position forward of the seat portion and at a similar level as the seat portion; and
   wherein the height of the body is less than or equal to one-half of the width of the body.

18. The vehicle of claim 17, wherein the vehicle is configured to be steered by the rider leaning, without turning a steering wheel.

19. The vehicle of claim 17, further comprising a switch disposed on the body, wherein the switch is configured to control the power delivered to the motor.

20. The vehicle of claim 17, wherein the height of the body is less than 12 inches.

* * * * *